(12) United States Patent
Dastoor et al.

(10) Patent No.: US 9,765,837 B2
(45) Date of Patent: Sep. 19, 2017

(54) ELECTRICALLY VARIABLE SUSPENSION

(71) Applicant: The Board of Trustees of the Leland Stanford Junior University, Palo Alto, CA (US)

(72) Inventors: Sanjay K Dastoor, Redwood City, CA (US); Mark R Cutkosky, Palo Alto, CA (US)

(73) Assignee: The Board of Trustees of the Leland Stanford Junior University, Palo Alto, CA (US)

( * ) Notice: Subject to any disclaimer, the term of this patent is extended or adjusted under 35 U.S.C. 154(b) by 481 days.

(21) Appl. No.: 14/391,047

(22) PCT Filed: Apr. 10, 2013

(86) PCT No.: PCT/US2013/035956
§ 371 (c)(1),
(2) Date: Oct. 7, 2014

(87) PCT Pub. No.: WO2013/155171
PCT Pub. Date: Oct. 17, 2013

(65) Prior Publication Data
US 2015/0069687 A1    Mar. 12, 2015

Related U.S. Application Data

(60) Provisional application No. 61/622,246, filed on Apr. 10, 2012.

(51) Int. Cl.
*H01L 41/08*    (2006.01)
*H01L 41/09*    (2006.01)
*H04R 17/00*    (2006.01)
*F16F 1/36*    (2006.01)

(52) U.S. Cl.
CPC .................... *F16F 1/3615* (2013.01)

(58) Field of Classification Search
CPC ........ F61F 1/3615; H04R 17/00; H01L 41/08; H01L 41/09
USPC ............... 310/324, 328, 354, 367, 371, 800
See application file for complete search history.

(56) References Cited

U.S. PATENT DOCUMENTS

| | | | |
|---|---|---|---|
| 4,088,915 A * | 5/1978 | Kodama | H04R 17/005 310/334 |
| 4,451,525 A * | 5/1984 | Kawazoe | G02F 1/13439 257/E31.119 |
| 6,376,969 B1 * | 4/2002 | Forck | H01L 41/053 310/346 |

(Continued)

FOREIGN PATENT DOCUMENTS

| | | | | |
|---|---|---|---|---|
| FR | 2932034 | * | 1/2006 | ............... H02N 2/18 |
| FR | 2908488 | | 8/2008 | |

(Continued)

*Primary Examiner* — Thomas Dougherty
(74) *Attorney, Agent, or Firm* — Lumen Patent Firm

(57) ABSTRACT

A variable stiffness spring is provided that includes a dielectric diaphragm having a biaxially pre-strained film, where the dielectric diaphragm includes an out-of-plane stiffness at zero voltage, a first electrode disposed on a first side of the dielectric diaphragm and a second electrode disposed on a second side of the dielectric diaphragm, where the out-of-plain stiffness is relaxed by an applied voltage between the first electrode and the second electrode.

8 Claims, 8 Drawing Sheets

(56) References Cited

U.S. PATENT DOCUMENTS

| | | | | |
|---|---|---|---|---|
| 6,427,017 B1 * | 7/2002 | Toki | ............... | B06B 1/0688 |
| | | | | 181/170 |
| 6,812,624 B1 * | 11/2004 | Pei | ............... | F02G 1/043 |
| | | | | 310/309 |
| 7,081,701 B2 * | 7/2006 | Yoon | ............... | H01L 41/0926 |
| | | | | 310/369 |

FOREIGN PATENT DOCUMENTS

| | | |
|---|---|---|
| JP | 2011144892 | 7/2011 |
| RU | 2404381 | 11/2011 |

* cited by examiner

ELECTRICALLY VARIABLE SUSPENSION

CROSS-REFERENCE TO RELATED APPLICATIONS

This application is a 371 of PCT/US2013/035956 filed on Apr. 10,2013. PCT/US2013/035956 filed on Apr. 10, 2013 claims the benefit of 61/622,246 filed on Apr. 10, 2012.

STATEMENT OF GOVERNMENT SPONSORED SUPPORT

This invention was made with Government support under contract no. W911NF-10-2-0016 awarded by the U.S. Army Research Laboratory. The Government has certain rights in the invention.

FIELD OF THE INVENTION

This invention relates to suspensions and actuators with scalable and variable stiffness.

BACKGROUND OF THE INVENTION

Passive compliance has become an increasingly important aspect of robotic and rehabilitation systems. Classically, robots have relied on stiff appendages and precise position control of joints to facilitate high-speed trajectory tracking. However, many applications benefit from an alternative approach that relies on inherent compliance to improve performance.

Biologically-inspired robots have long included passive compliance as a key design element. Running, hopping, climbing and perching robots have been designed where appropriate selection of joint and appendage impedance leads to reduced shock forces, increased robustness, and increased efficiency via energy storage and release. Such strategies are inspired in part by animals' ability to vary joint impedance via co-contraction of antagonistic muscles. Active impedance control with stiff actuators is possible, but is limited by bandwidth, weight, and power consumption.

Human-safe robot operation also shares similar requirements. In industrial robot manipulators, passive compliance helps prevent humans from experiencing high forces during accidental contact. In rehabilitation devices, impedance matching with the patient is necessary for many tasks. Here, passive compliance promotes "fail-safe" operation when compared to active impedance control.

Passive compliance can be achieved through devices such as the series elastic actuator (SEA), combining a passive spring and a stiff motor. Advantages include low weight and few moving parts. However, their ability to vary this compliance is still limited to active control of the serial motor. To achieve variable passive compliance, several different techniques can be used, broadly categorized into antagonistic systems and structure-controlled systems.

Antagonistic systems rely on manipulation of nonlinear springs to change their equilibrium position. An example such as AMASC can independently control joint position and stiffness. These systems, while similar to the biological strategy of muscle co-contraction, have disadvantages in compact robotic devices due to their motor size requirements, power usage, mechanical complexity, and weight.

Structure-controlled systems exploit a change in passive spring geometry or coupling. Varying the effective length of a spring or the moment of inertia of a beam are common methods to achieve this. While they use less power to change stiffness and are much simpler mechanically, these systems still have moving parts and often a heavy or bulky actuator, precluding their use in applications with tight mass or volume constraints.

Electroactive polymers have been described as "artificial muscles" due to several muscle-like properties, such as inherent passive compliance and damping, low weight, flexible geometry, and silent operation. They have been examined most often as a prime mover actuator, with very high strains and forces possible using careful design and multiple film layers. However, their disadvantages include high voltage requirements, low bandwidth due to hysteretic losses, and actuator failure due to manufacturing defects, mechanical film overstrain and tearing, and dielectric breakdown and shorting.

What is needed is a variable stiffness spring that is light-weight, flexible and highly responsive.

SUMMARY OF THE INVENTION

A variable stiffness spring is provided that includes a dielectric diaphragm having a biaxially pre-strained film, where the dielectric diaphragm includes an out-of-plane stiffness at zero voltage, a first electrode disposed on a first side of the dielectric diaphragm and a second electrode disposed on a second side of the dielectric diaphragm, where the out-of-plane stiffness is relaxed by an applied voltage between the first electrode and the second electrode.

According to one aspect of the invention, the biaxially pre-strained film includes a biaxial pre-strain up to 400%× 400%.

In another aspect of the invention, a first anti-tear coating is disposed between the first electrode and the dielectric diaphragm, where a second anti-tear coating is disposed between the second electrode and the dielectric diaphragm, in one aspect the first anti-tear coating and the second anti-tear coating are made from material selected from the group consisting of silicone rubber, latex rubber and polyurethane and similar elastomeric materials.

According to a further aspect of the invention, a first frame element is disposed on an outsides surface of the first electrode and a second frame element is disposed on an outside surface of the second electrode. In one aspect, a first frame element and the second frame element are made from material that can include fiberglass reinforced plastic sheet, acrylic sheet, acetal sheet and other non-conductive hard plastics. It is also possible to use conductive materials such as metal (e.g., aluminum) or carbon fiber reinforced sheet if an insulating layer (e.g. kapton film) is used between the frame and electrode.

In a further aspect of the invention, the dielectric diaphragm is an acrylic dielectric diaphragm.

In yet another aspect of the invention, a first anti-tear coating is disposed between the first electrode and the dielectric diaphragm, and a second anti-tear coating is disposed between the second electrode and the dielectric diaphragm, wherein a first frame element is disposed on an outsides surface of the first electrode and a second frame element is disposed on an outside surface of the second electrode, where the variable stiffness is a stack of at least two the variable stiffness springs.

DETAILED DESCRIPTION

Figure 1:
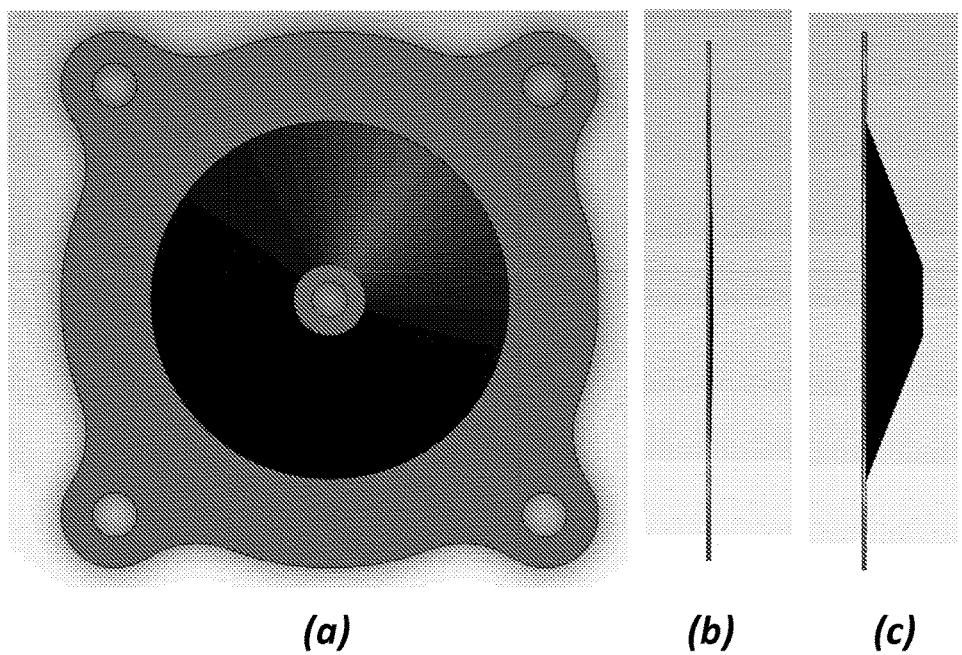
FIG. 1$a$-1$c$ show a single layer diaphragm. (a) Front view, (b) Side view, no displacement, (c) Side view, displaced, according to one embodiment of the invention.

The present invention provides suspensions or actuators useful in bio-inspired devices such as robots, prosthetics and rehabilitation devices as well as other applications, such as vibration damping, shock absorption, vehicle suspension, toys, loudspeakers or the like. Current methods and devices require mechanical motion to change stiffness. The time to change stiffness associated with these devices is on the order of hundreds of milliseconds. The necessary components to capture this change, such as gears, pulleys, or other mechanical hardware, add weight and mechanical complexity to the devices. The devices of the present invention weigh orders of magnitude less and can change stiffness orders of magnitude fasters than these current devices. In one embodiment of the invention, the stiffness of a spring can be electrically changed as needed by the device it is part of. The spring, according to one example, can be an electroactive polymer actuator. These actuators rely on voltages applied to thin, stretchy films that cause the films to deform. By constraining the film's deformation, the stiffness of the film decreases under applied voltage. Because the stiffness change does not rely on mechanical movement, this change can occur very quickly (e.g. <5 ms). In one example, the electrically tunable spring can change stiffness by a factor of 10 in less than 10 ms compared to devices dependent on mechanical motion to change stiffness. The devices according to the invention are easily scalable to different sizes and can be powered by a <10 gram high voltage power supply. Application of a signal between 0-10 V causes the spring stiffness to change. The films can be stacked or connected in ways to adapt their force and displacement to the application required. Additional examples, could be the use of other films or materials as well as other electrode materials over the film.

According to embodiments of the current invention, the design, analysis, and experimental validation of a variable stiffness device based on annular dielectric electroactive polymer (EAP) actuators is provided. In one embodiment, the example device is based on a diaphragm geometry, which partially linearizes the viscoelastic response of acrylic dielectrics, providing voltage-controlled stiffness without high damping losses. In a further embodiment, multiple diaphragms can be connected in a single device to increase stiffness or provide custom stiffness profiles. The geometry is analyzed to determine the relationship among force, displacement and voltage. An example single-layer diaphragm was constructed and tested to validate the concept, demonstrating up to 10× change in stiffness.

Provided below is an embodiment of a variable stiffness device that utilizes the applied voltage (from 0 to 6 kV at 100 μA) to vary the effective mechanical pre-strain of the actuator film, allowing a 7× to 10× change in stiffness. The geometry and construction of the device greatly reduce failure rates, linearize the viscoelastic hysteresis of the film material, and allow scaling to a range of displacements and forces suited to small robots.

In one embodiment of the invention, provided is a device that takes advantage of voltage-induced relaxation to significantly change its out-of-plane stiffness. The significant prestrain required for acrylic dielectrics translates into measurable stiffness at zero voltage. When voltage is applied, the prestrain relaxes, dropping the effective stiffness. The diaphragm concept can be seen in FIG. 1.

Turning now to the relationship between the displacement of the diaphragm, x and the corresponding spring force, $T_x$, as well as the effect of voltage V. When examining the stresses due to prestrain, voltage, and mechanics in an infinitesimal element of the membrane, the radial forces are scaled by cross-sectional area, which in polar coordinates has width $rd\theta$ on one side of the element and $(r+dr)d\theta$ on the other side. This causes nonlinear radial effects, such as the approximately catenoid shape of the annulus under out-of-plane deformation.

Figure 2:
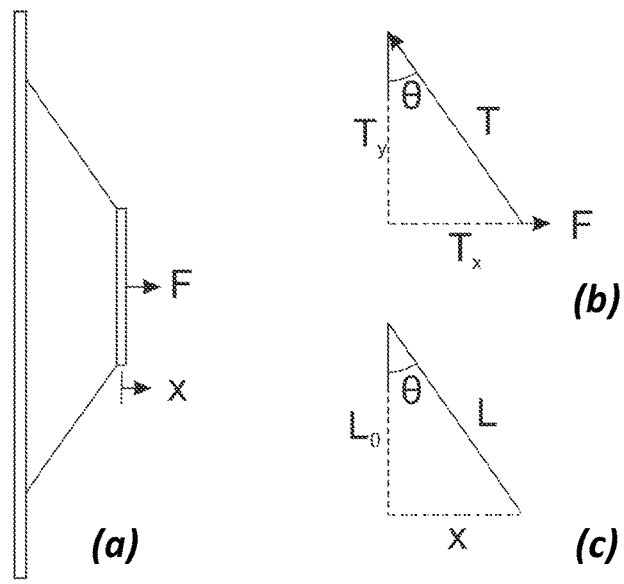
FIG. 2a-2c show a side view (2a) of single diaphragm on the left with applied force F and resulting displacement x. Radial slice (2b-2c) show film tension T cancel and Tx terms equal F, according to one embodiment of the invention.

Making some assumptions to simplify modeling of the device's behavior under small displacements, first it is assumed that the out-of-plane slope of the membrane under deformation is approximately constant, forming a conical frustum. Here, it is assumed that the material is linear-elastic, since moderate displacements of the diaphragm only cause small displacements of the dielectric material. Initially, one cross-sectional slice of material is examined, as shown in FIGS. 2a-2c.

The relationship between the tension in the prestrained film and the displacement of the film is given by $$T = T_0 + k(L - L_0) - T_v \quad (1)$$

where $T_0$ is the tension due to prestrain, $L_0$ is the film length at x=0, and $T_v$ is the relaxation due to applied voltage. To calculate the relationship between the displacement of the diaphragm, x and the required force, $T_x$ we use trigonometry to show that $$\cos\theta = \frac{x}{L} = \frac{T_x}{T} \quad (2)$$

$$L = \sqrt{x^2 + L_0^2} \quad (3)$$

$$T_x = \frac{(T_0 - T_v)x}{\sqrt{x^2 + L_0^2}} + kx\left(1 - \frac{L_0}{\sqrt{x^2 + L_0^2}}\right) \quad (4)$$

Figure 3:
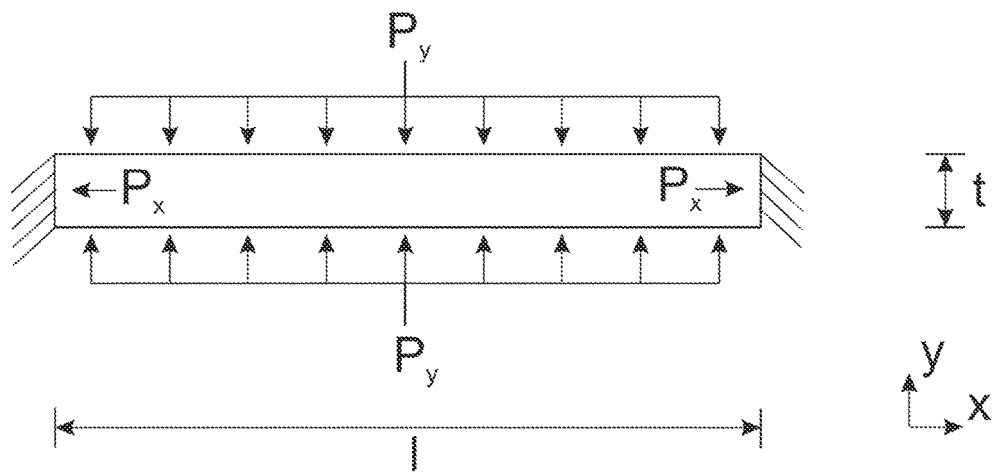
FIG. 3 shows the effective electrostatic pressure applied to a constrained film of unit width, according to one embodiment of the invention.

The effect of voltage on the tension in the film is modeled in FIG. 3. For a given radial slice of the frustrum membrane and an incompressible material, the slice experiences zero strain due to boundary conditions, giving us a hydrostatic pressure equivalence:

$$P_x = P_y \quad (5)$$

The effective Maxwell pressure due to an applied electric field is given by $$p = \epsilon_0 \epsilon_r E^2 = \frac{\epsilon_0 \epsilon_r V^2}{t^2} \quad (6)$$

For length l, thickness t, and width w, the voltage-induced relaxation $T_v$ in the film is $$T_v = P_x tw \quad (7)$$

$$T_v = \frac{\epsilon_0 \epsilon_r V^2 w}{t} \quad (8)$$

Finally, included is the relationship between t and x. Since radial symmetry precludes any change in w and the material is incompressible, we know that $$t = \frac{t_0 l_0}{l} = \frac{t_0 L_0}{\sqrt{x^2 + L_0^2}} \quad (9)$$

Combining equations (4), (8), and (9), the relationship between Tx, x, and V is given by:

$$T_x = \left(\frac{T_0 - kL_0}{\sqrt{x^2 + L_0^2}} + k - \frac{\epsilon_0 \epsilon_r V^2 w}{t_0 L_0}\right)x \quad (10)$$

Figure 4:
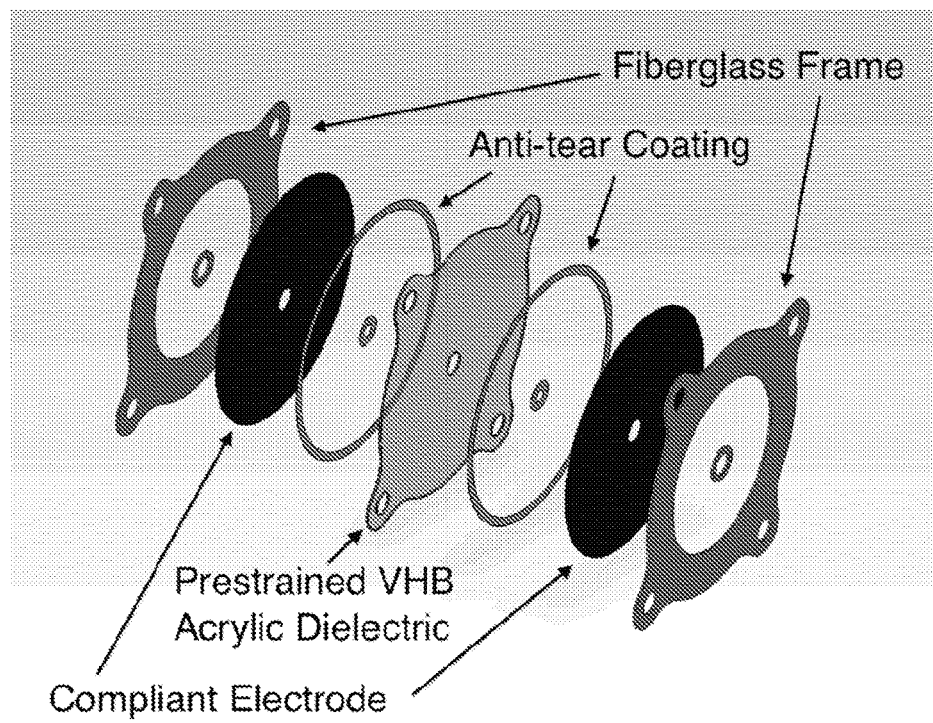
FIG. 4 shows an exploded view of the diaphragm, according to one embodiment of the invention.

Example fabricated actuators were based on an acrylic film, VHB 4910 (3M Corporation, USA), that was prestrained biaxially 400%×400%. A silicone or latex film was applied over the entire non-active film area, preventing tearing and early dielectric breakthrough at the electrode edges. Masks were applied and the film sprayed with conductive electrode composed of carbon black powder (Vulcan XC72R, Cabot Corporation, USA) and polydimethylsiloxane (PDMS) oil (ClearCo, USA), thinned with hexanes. An exploded view of the actuator is shown in FIG. 4.

Figure 5:
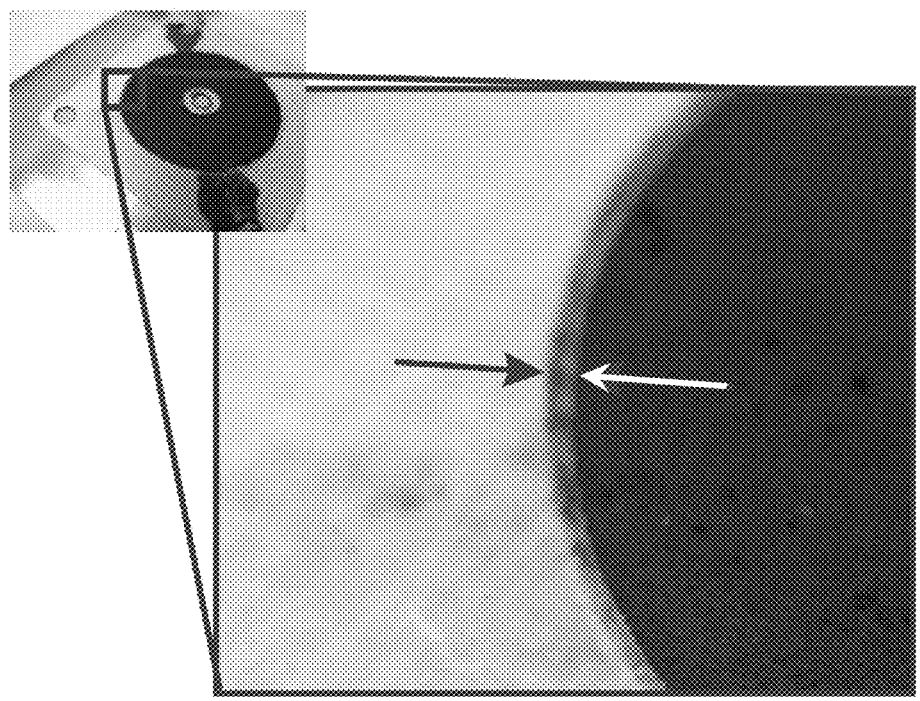
FIG. 5 shows an example actuator showing misalignment of fiberglass frame and compliant electrode. The distance between the arrows is approximately 800 μm, according to one embodiment of the invention.

Hand alignment was sufficient for the planar actuators in, with large actuator parts and only single layers of dielectric. When these techniques were applied to diaphragms, misalignment was frequent. As seen in FIG. 5, smaller parts, free-floating elements, and multiple layers caused offsets between overlapping layers. Resulting actuators had low manufacturing yields or early failures due to high voltage arcing and stress concentrations at stiff-soft interfaces. In addition, it was noted empirically that both electrical shorts and mechanical tears almost always initiated at the electrode edges. The frame element can be made of material such as fiberglass reinforced plastic sheet, acrylic sheet, and acetal sheet, carbon fiber reinforced sheet, where an insulating layer is used between the carbon fiber reinforced sheet frame and each said electrode.

To address this, an alignment system was implemented for each mask and part. Templates were made from acrylic and non-stick backing layers using a laser cutter (Helix 24, Epilog, USA) to allow rapid yet precise hand placement without damaging the dielectric film. As a result, the time needed for a single actuator manufacturing run dropped to approximately 1 hour, with the volume limited only by the laser cutter bed dimensions, while the manufacturing yields improved to close to 100%.

An important advantage of the alignment system was the ability to implement small but consistent overlaps between the electrode material and the anti-tear coating. This effectively thickens the film at the mechanical interface, providing two advantages. First, this decreases stress concentrations under loading and results in fewer mechanical failures. Second, the charges on each electrode repel each other, resulting in locally higher voltages at the edges of the electrode. Increasing the film thickness at the edges reduces the electric field strength, reducing the likelihood of dielectric breakdown. The implementation of this coating layer has resulted in actuator samples with thousands of cycles of both mechanical and electrical loading without failure either during shelf storage or testing. The anti-tear coating can be made from material that includes silicone rubber, latex rubber or polyurethane and similar elastomeric materials.

Design variables for a single diaphragm, besides generalized actuator parameters such as prestrain, are limited to inner and outer diameter of the active area. For a proof-of-Design variables for a single diaphragm, besides generalized actuator parameters such as prestrain, are limited to inner and outer diameter of the active area. For a proof-of-concept test, the inner diameter was minimized without jeopardizing arcing while the outer diameter was chosen for ease of handling and testing.

Experimental data were collected using a muscle lever (305B, Aurora Scientific, Canada) that can prescribe either a force or length trajectory and return measured force and length. The model used in these experiments was limited to 5N of force and 20 mm of displacement.

Figure 6:
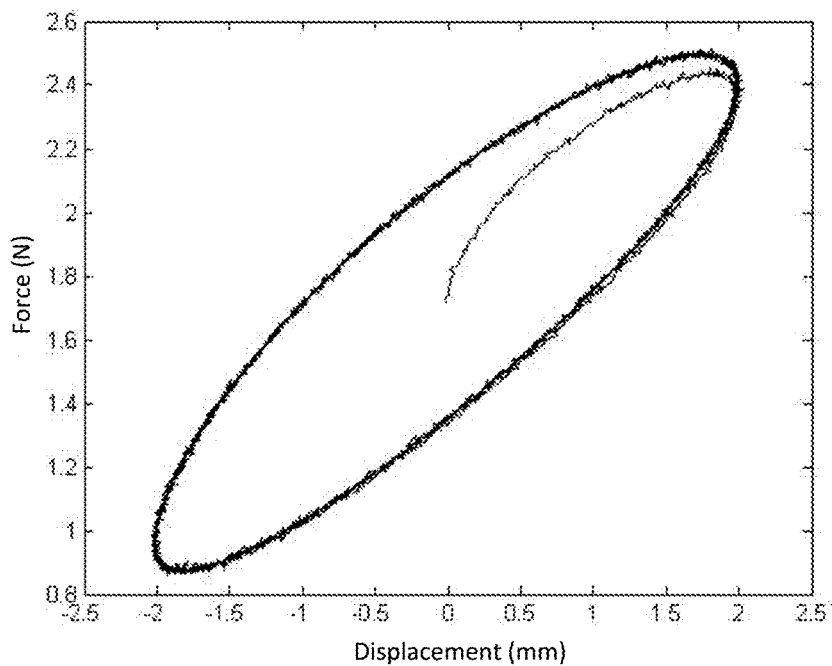
FIG. 6 shows a workloop test on planar sample of VHB 4910, according to one embodiment of the invention.

Sinusoidal length trajectories were applied for five seconds. The resulting force vs length curve, known as a workloop, is used in characterization of compliant biological tissue. An ideal spring would yield a perfectly linear plot. Hysteresis, represented by the area inside the loop, indicates losses due to damping. As seen in the planar sample test in FIG. 6, VHB 4910 has considerable viscoelastic losses, complicating modeling and constraining its application as a variable stiffness device.

However, the geometry of a diaphragm actuator results in a significantly more linear response. This is due in part to the low strain of the active material relative to displacement of the diaphragm. Viscoelastic losses become noticeable at higher displacements, but are still much lower than for the base VHB material.

Figure 7:
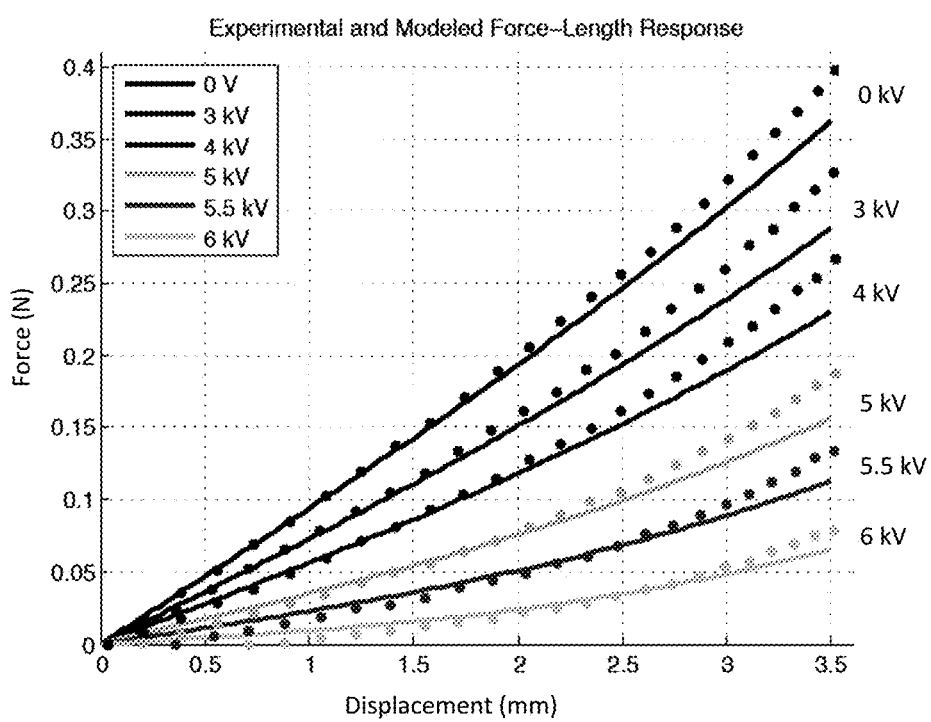
FIG. 7 shows modeled vs experimental force-displacement for different applied voltages. Dotted lines are experimental, solid lines are modeled, according to one embodiment of the invention.

The relationship between F, x, and V generally matches the model presented in Equation 10. FIG. 7 shows force displacement curves for different voltages. Note that for displacements above 2.5 mm, viscoelastic losses, nonlinear film loading, and nonlinear voltage relaxation cause some deviation from the model.

Figure 8:
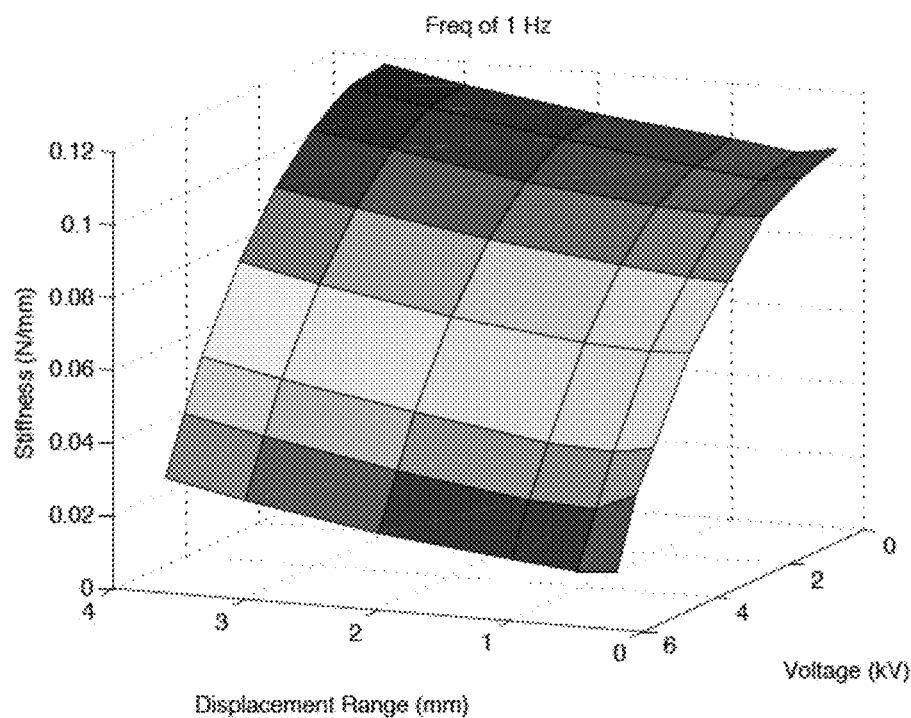
FIG. 8 shows the stiffness vs Voltage and Displacement Range at 1 Hz, according to one embodiment of the invention.
Figure 9:
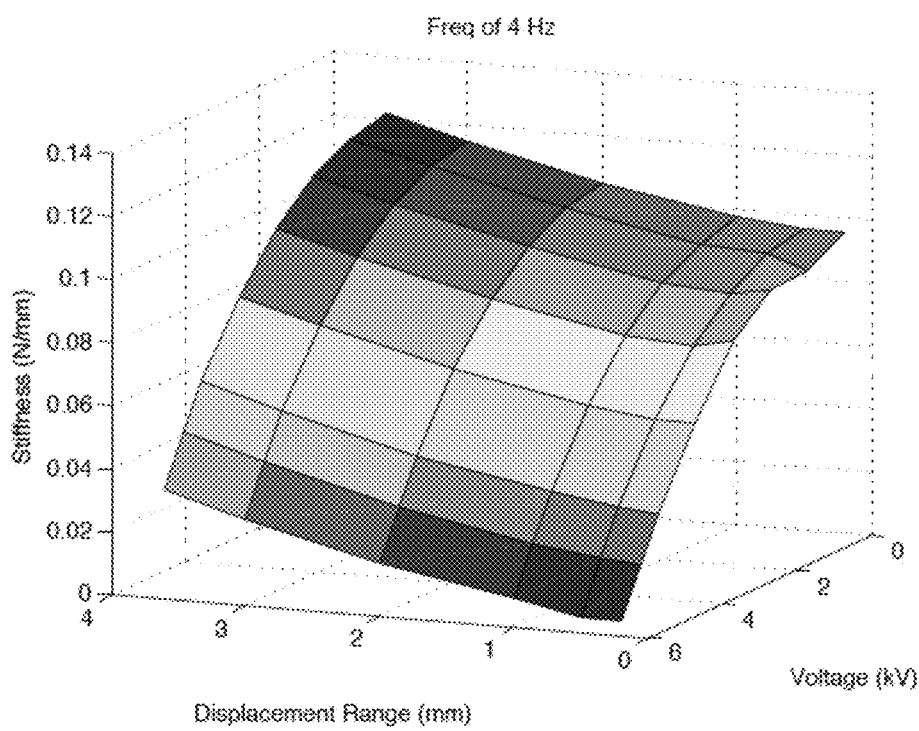
FIG. 9 shows the stiffness vs Voltage and Displacement Range at 4 Hz, according to one embodiment of the invention.

The slope of the workloop, dF/dx, is the effective stiffness. By calculating the average stiffness over several displacement ranges and voltages, a map can be formed as in FIG. 8 and FIG. 9. We can see that for low frequencies, average stiffness slightly increases as displacement increases, but generally there is a 700-1000% possible change in stiffness. As frequencies increase, the viscoelastic losses at high displacements become significant, increasing the average stiffness and decreasing the change to approximately 400%. A summary of the properties of the test unit are shown in Table I.

TABLE I

Test diaphragm properties

| | |
|---|---|
| Mass (g) | 1.6 |
| Dimensions (mm) | 38 × 38 × 0.7 |
| Inner diameter (mm) | 5.5 |
| Outer diameter (mm) | 25 |
| Displacement range (mm) | 8 |
| Stiffness range over 1 mm (N/m) | 15-102 |
| Stiffness range over 8 mm (N/m) | 32-117 |

The stiffness of a single diaphragm is limited by the stiffness of the actuator material. To scale stiffness for a given application, more than one actuator layer is used, according to embodiments of the invention. In one embodiment, multiple layers in the same diaphragm unit are provided, where the multi-layer diaphragm unit, due to the contact between electrodes, has identical geometry and electrical activation across all layers.

Figure 10:
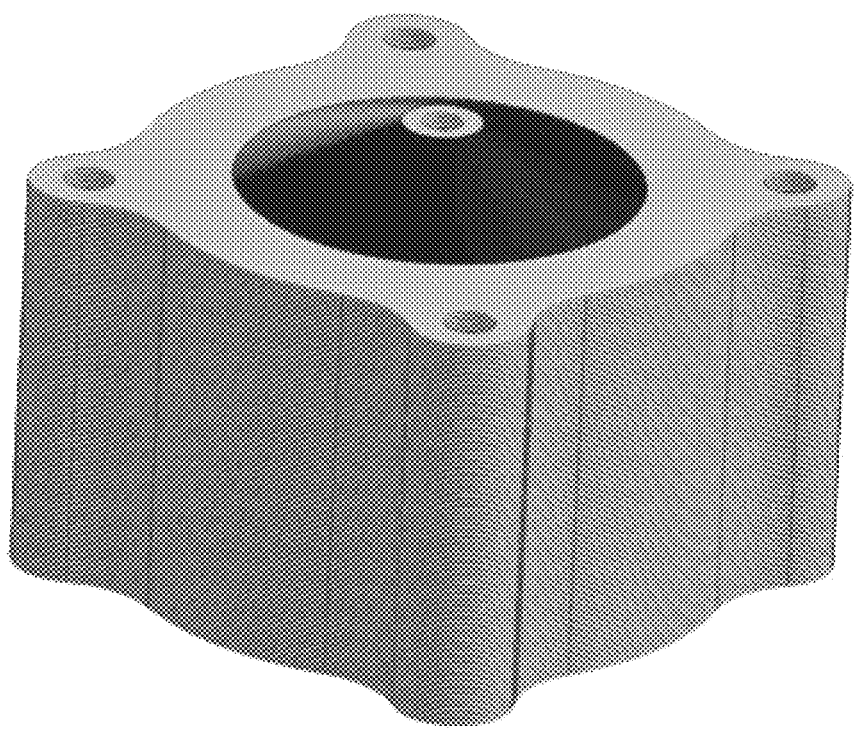
FIG. 10 shows multi-unit stack variable springs, according to one embodiment of the invention.
Figure 11:
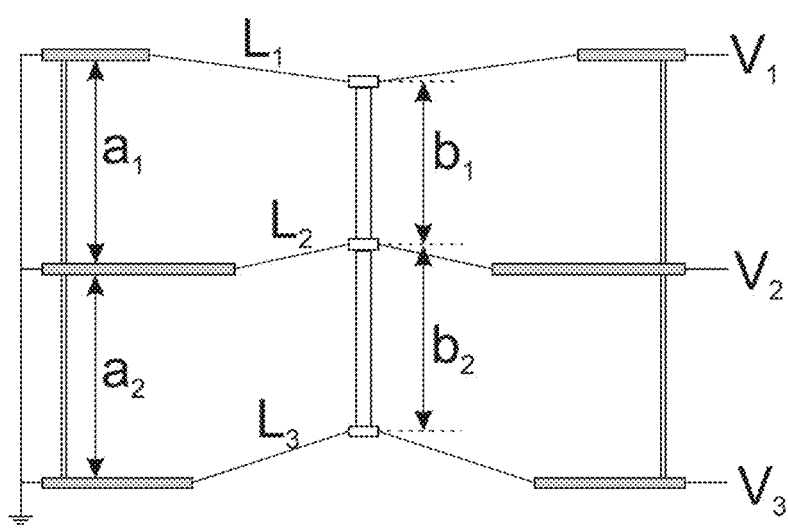
FIG. 11 shows a cross-section of three units, according to one embodiment of the invention.

The single layer diaphragm units in a stacked configuration, is shown in FIG. 10 and with exaggerated geometries and spacing in FIG. 11. Design variables include the spacing between units ($a_n$), the offset between output shafts ($b_n$), the applied voltages ($V_n$), and the diameter of each unit ($L_n$). Each unit's force-length curve would depend on its geometry and applied voltage, while the equilibrium position would be shifted by the unit spacing and output offsets. The force-length curves, or stiffness profiles, of each unit are superimposed to give the stiffness profile of the entire stack. According to further embodiments, by manipulating the design variables, custom profiles can be constructed for a given application. Independent voltage channels for each actuator would allow even more customization during operation.

Figure 12A:
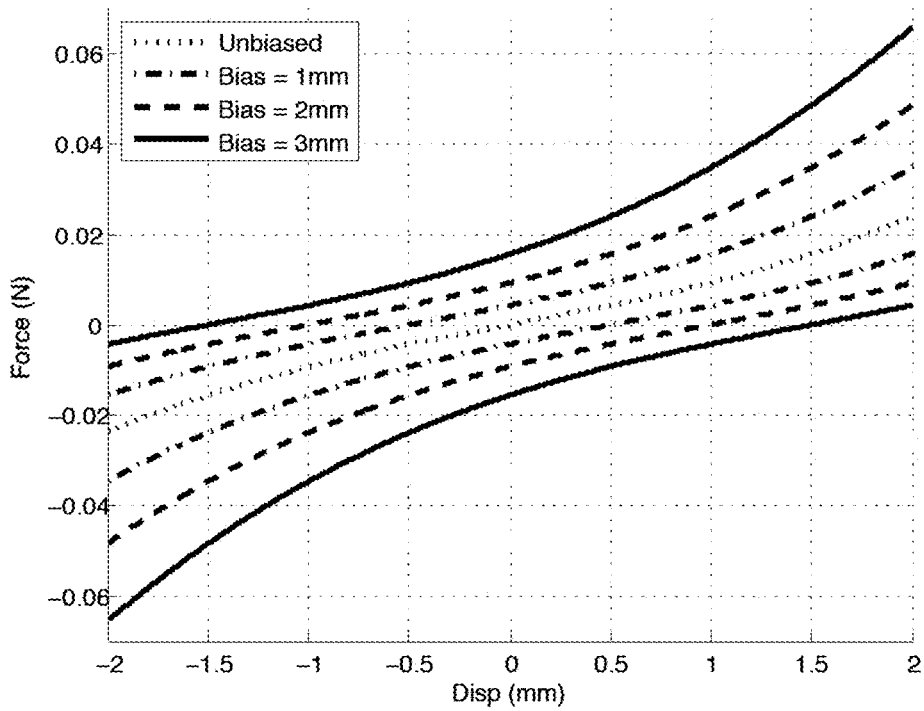
FIGS. 12a-12b show a simulated stiffness profile for two unit multi-stack. 12(a) shows individual unit profiles for varying biases. 12(b) shows stack profile for varying biases, according to one embodiment of the invention.
Figure 12B:
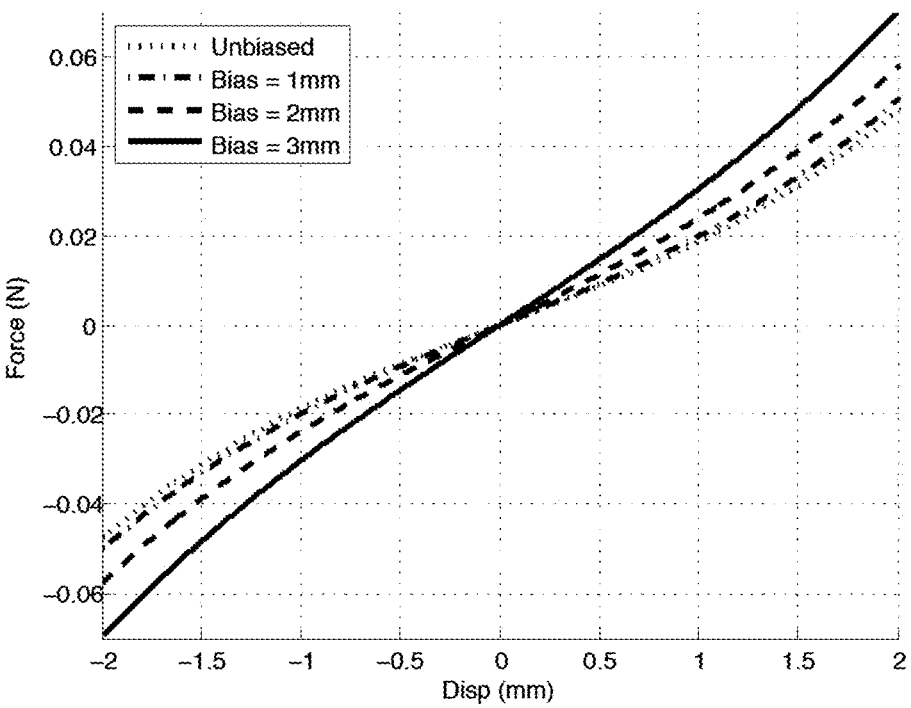
Figure 13:
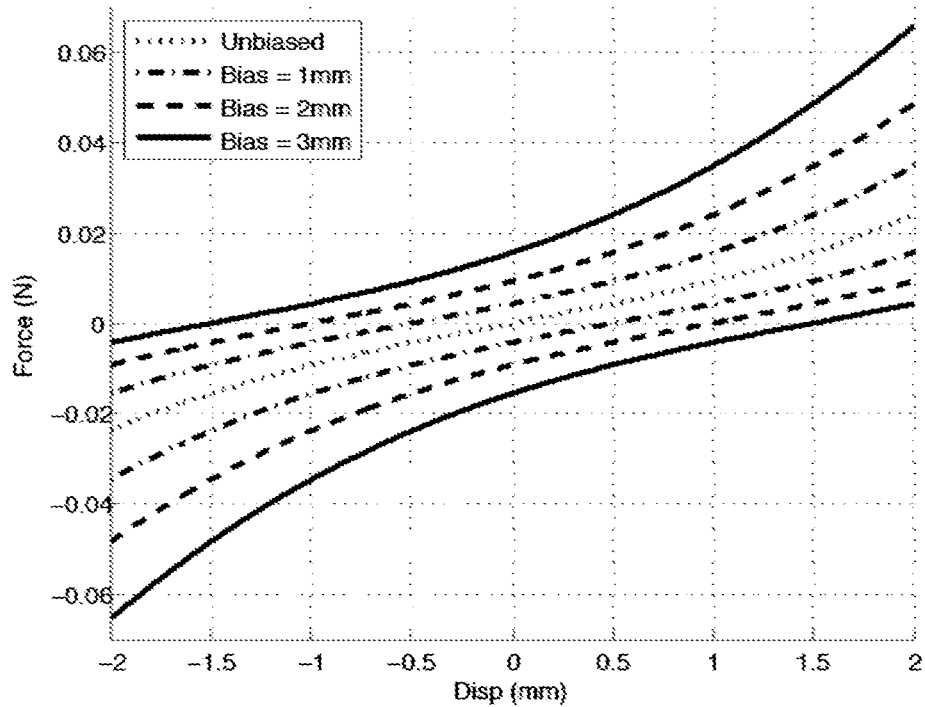
Figure 14:
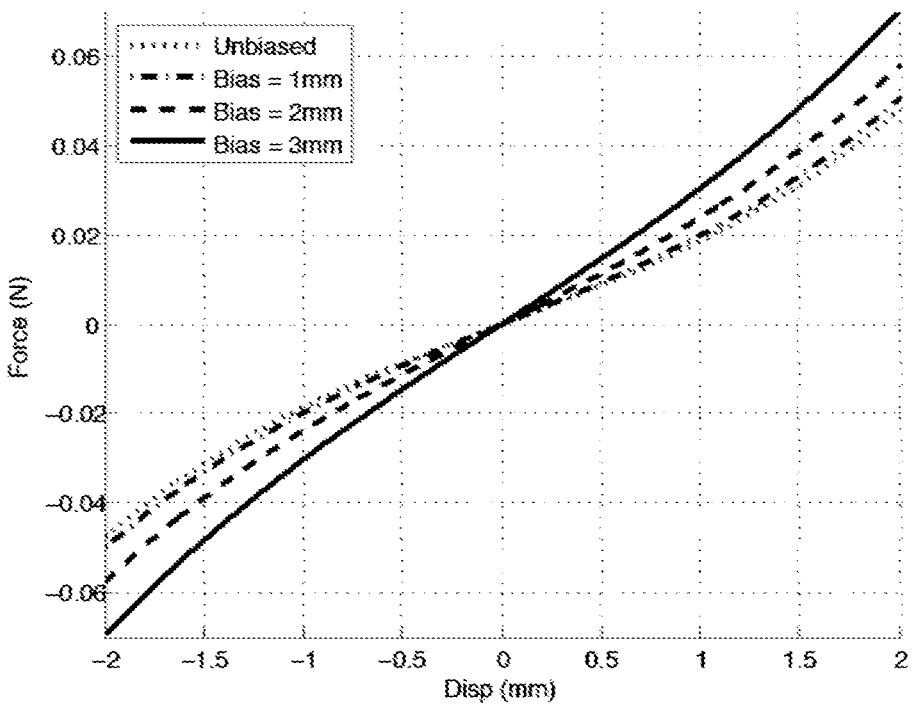

In one exemplary embodiment, given are two units with $L_1=L_2$ and $V_1=V_2$. By varying the displacement bias before coupling them, which varies the quantity a–b, each diaphragm's equilibrium point is can be shifted along its force-length curve, as seen in FIG. 12a. Lining up these equilibrium points (in a way that achieves force balance) and adding the curves yields the resultant profile, as shown in FIG. 12b. Biasing and shifting a linear spring curve always yields a linear output, but, as seen in this example, a nonlinear curve can be linearized.

The current invention relies on a combination of electric actuation and a viscoelastic load-bearing structure in a single material. This makes the device light, compact, scalable, and mechanically simple, while leveraging the inherent bandwidth and low power consumption of dielectric EAP actuators. The invention is well-suited to robotic and rehabilitation systems.

The invention overcomes the disadvantages of dielectric EAP actuators. Higher manufacturing yield rates (approaching 100%) and very low failure rates (>1000 cycles invention.

The present invention has now been described in accordance with several exemplary embodiments, which are intended to be illustrative in all aspects, rather than restrictive. Thus, the present invention is capable of many variations in detailed implementation, which may be derived from the description contained herein by a person of ordinary skill in the art. For example multiple units may be combined in parallel to achieve a variable spring with higher stiffness and multiple alternating layers of film and electrode may be deposited to achieve a single unit of higher stiffness. In addition, the geometry of the diaphragm can be varied, for example as an oval or ellipse instead of a circle, to better match packaging requirements.

All such variations are considered to be within the scope and spirit of the present invention as defined by the following claims and their legal equivalents.

What is claimed:

1. A variable stiffness spring, comprising:
   a. a dielectric diaphragm, wherein said dielectric diaphragm comprises a biaxially pre-strained film, wherein said dielectric diaphragm comprises an out-of-plane stiffness at zero voltage;
   b. a first electrode disposed on a first side of said dielectric diaphragm; and
   c. a second electrode disposed on a second side of said dielectric diaphragm, wherein said out-of-plane stiffness is relaxed by an applied voltage between said first electrode and said second electrode, wherein a first anti-tear coating is disposed between said first electrode and said dielectric diaphragm, and a second anti-tear coating is disposed between said second electrode and said dielectric diaphragm.

2. The variable stiffness spring of claim 1, wherein said biaxially pre-strained film comprises a biaxial pre-strain up to 400% ×400%.

3. The variable stiffness spring of claim 1, wherein said first anti-tear coating and said second anti-tear coating are made from material selected from the group consisting of silicone rubber, latex rubber and polyurethane.

4. The variable stiffness spring of claim 1, wherein a first frame element is disposed on an outsides surface of said first electrode and a second frame element is disposed on an outside surface of said second electrode.

5. The variable stiffness spring of claim 4, wherein a first frame element and said second frame element are made from material selected from the group consisting of fiberglass reinforced plastic sheet, acrylic sheet, and acetal sheet.

6. The variable stiffness spring of claim 4, wherein a first frame element and said second frame element are made from material selected from the group consisting of aluminum sheet and carbon fiber reinforced sheet, wherein an insulating layer is used between said carbon fiber reinforced sheet frame and each said electrode.

7. The variable stiffness spring of claim 1, wherein said dielectric diaphragm comprises an acrylic dielectric diaphragm.

8. The variable stiffness spring of claim 1, wherein a first anti-tear coating is disposed between said first electrode and said dielectric diaphragm, and a second anti-tear coating is disposed between said second electrode and said dielectric diaphragm, wherein a first frame element is disposed on an outside surface of said first electrode and a second frame element is disposed on an outside surface of said second electrode, wherein said variable stiffness comprises a stack of at least two said variable stiffness springs.

* * * * *